United States Patent [19]
Ando et al.

[11] Patent Number: 5,334,686
[45] Date of Patent: Aug. 2, 1994

[54] PRESSURE-SENSITIVE ADHESIVE AND ADHESIVE SHEETS USING THE SAME

[75] Inventors: Masahiko Ando; Takeshi Yamanaka; Yutaka Moroishi; Yasuyuki Tokunaga; Yoshinao Kitamura, all of Osaka, Japan

[73] Assignee: Nitto Denko Corporation, Osaka, Japan

[21] Appl. No.: 159,124

[22] Filed: Nov. 30, 1993

[30] Foreign Application Priority Data

Nov. 30, 1992 [JP] Japan ................................. 4-345446

[51] Int. Cl.$^5$ ............................................. C08F 20/54
[52] U.S. Cl. .................... 526/307.7; 526/265; 526/278; 526/287; 428/522
[58] Field of Search ............... 526/307.7, 265, 278, 526/287; 428/522

[56] References Cited

U.S. PATENT DOCUMENTS

| | | | |
|---|---|---|---|
| 3,936,513 | 2/1976 | Lorenz et al. | 526/307.7 |
| 4,067,839 | 1/1978 | Schultz | 526/303 |
| 4,259,465 | 3/1981 | Barabas | 526/65 |
| 4,388,436 | 6/1983 | Chen | 524/553 |
| 4,548,990 | 10/1985 | Mueller et al. | 525/123 |
| 4,625,009 | 11/1986 | Izumitani et al. | 526/307.5 |

FOREIGN PATENT DOCUMENTS

| | | |
|---|---|---|
| 1195050 | 6/1965 | Fed. Rep. of Germany . |
| 1271399 | 6/1968 | Fed. Rep. of Germany ... 526/307.7 |
| 60-250015 | 12/1985 | Japan . |
| 899342 | 6/1962 | United Kingdom . |
| 1072331 | 6/1967 | United Kingdom ............ 526/307.7 |
| 962109 | 6/1984 | United Kingdom . |

Primary Examiner—Joseph L. Schofer
Assistant Examiner—N. Sarofim
Attorney, Agent, or Firm—Sughrue, Mion, Zinn, Macpeak & Seas

[57] ABSTRACT

A pressure-sensitive adhesive and adhesive sheets using the pressure-sensitive adhesive are disclosed. The pressure-sensitive adhesive comprising (a) from 50 to 84% by weight of an acrylic monomer, (b) from 15 to 28% by weight of an N,N-di-substituted (meth)acrylamide, (c) from 1 to 10% by weight of a monomer having an acid group, and (d) from 0 to 25% by weight of other monomer copolmerizable with the components (a) to (c).

11 Claims, No Drawings

PRESSURE-SENSITIVE ADHESIVE AND ADHESIVE SHEETS USING THE SAME

FIELD OF THE INVENTION

The present invention relates to a pressure-sensitive adhesive comprising an acrylic polymer as the main component and adhesive sheets or tapes using the pressure-sensitive adhesive.

BACKGROUND OF THE INVENTION

Pressure-sensitive adhesives comprising an acrylic polymer, a natural rubber, etc., as the main component have been widely utilized in various fields and recently, for improving the simplicity of workings and for improving safety and hygiene, an adhesive treatment is almost carried out using an adhesive sheet or tape in place of a liquid-type adhesive.

However, an acrylic pressure-sensitive adhesive which does not contain a tackifier is slightly poor in the adhesive property to materials such as plastics, etc., and on the other hand, a rubber-based pressure-sensitive adhesive and an acrylic pressure-sensitive adhesive containing a tackifier may have a relatively good adhesive property to plastics, etc., but has a problem that such adhesives are poor in the durability for a long period of time and the creep characteristics.

SUMMARY OF THE INVENTION

The present invention has been made under the above-described the conventional circumstances.

One object of the present invention is to provide a pressure-sensitive adhesive showing a good adhesive property to various materials and having excellent durability.

Another object of the present invention is to provide adhesive sheets using the pressure-sensitive adhesive.

As a result of various investigations to attain the objects described above, it has been found that a pressure-sensitive adhesive showing a good adhesive property to various materials and having excellent durability is obtained by using an acrylic polymer comprising a specific monomer composition. It has been succeeded to accomplish the present invention based on this finding.

That is, according to one embodiment of the present invention, there is provided a pressure-sensitive adhesive comprising an acrylic polymer comprising following components (a) to (d);

(a) from 50 to 84% by weight of an acrylic monomer represented by formula (1):

wherein $R^1$ represents hydrogen or methyl and $R^2$ represents an alkyl group having from 4 to 14 carbon atoms, (b) from 15 to 28% by weight of an N,N-di-substituted (meth)acrylamide represented by formula (2);

wherein $R^3$ represents hydrogen or methyl and $R^4$ and $R^5$ represent an alkyl group or organic groups which combine with each other to form a heterocyclic ring with the N atom, (c) from 1 to 10% by weight of a monomer having an acid group, and (d) from 0 to 25% by weight of other monomer copolymerizable with the components (a) to (c) described above.

According to another embodiment of the present invention, there is provided an adhesive sheet comprising a support having a layer of the pressure-sensitive adhesive described above on one surface or both surfaces thereof.

DETAILED DESCRIPTION OF THE INVENTION

The present invention is described in detail below.

Examples of the acrylic monomer as the component (a) used in the present invention are acrylic acid esters or methacrylic acid esters represented by formula (1) wherein $R^2$ is an alkyl group such as butyl, isobutyl, isoamyl, hexyl, heptyl, 2-ethylhexyl, isooctyl, isononyl, isodecyl, etc.

If the carbon atom number of the alkyl group shown by $R^2$ in formula (1) is less than 4, the wettablity of the pressure-sensitive adhesive deteriorates to reduce the initial adhesive property, and if the carbon atom number is over 14, a problem occurs that the pressure-sensitive adhesive becomes poor in the adhesive force, which are undesirable in the present invention.

The acrylic monomer as the component (a) is used in an amount of from 50 to 84% by weight, and preferably from 60 to 80% by weight, per the total weights of the monomers. The acrylic monomers may be used alone or as mixtures thereof.

If the amount of the acrylic monomer is less than 50% by weight, the performance as an acrylic pressure-sensitive adhesive is not obtained and if the amount thereof is over 84% by weight, the proportions of the components (b) and (c) become insufficient by the increased proportion of the component (a), whereby the pressure-sensitive adhesive having excellent adhesive force and durability, which is the object of the invention, is not obtained.

The N,N-di-substituted (meth)acrylamide as the component (b) used in the present invention includes an acyclic (meth)acrylamide of formula (2) wherein $R^4$ and $R^5$ are an alkyl group and a cyclic (meth)acrylamide of formula (2) wherein $R^4$ and $R^5$ combine with each other to form a heterocyclic ring with the N atom, and in the present invention, one or both of them are used according to the purpose of use of the pressure-sensitive adhesive.

Examples of the aclyic (meth)acrylamide are N,N-dimethyl(meth)acrylamide, N,N-diethyl(meth)acrylamide, N,N-dibutyl(meth)acryamide, etc. Examples of the cyclic (meth)acrylamide are N-(meth)acryloylmorpholine, N-(meth)acryloylpyrrolidine, N-(meth)acryloylpiperidine, N-(meth)acryloylpyrrolidine, N-(meth)acryloyl-4-piperidone, etc.

The N,N-di-substituted (meth)acrylamide as the component (b) is used in an amount of from 15 to 28% by weight, preferably from 16 to 25% by weight, and more preferably from 17 to 24% by weight, based the total weights of the monomers. The N,N-di-substituted (meth)acrylamides may be used alone or as mixtures thereof.

If the amount of the component (b) is less than 15% by weight, the adhesive force of the pressure-sensitive adhesive to various materials is decreased and if the amount thereof is over 28% by weight, the elasticity as the pressure-sensitive adhesive is increased to lower the wettability of the pressure-sensitive adhesive, whereby the adhesive force is also lowered.

Examples of the monomer having an acid group as the component (c) used in the present invention are carboxyl group-containing monomers such as acrylic acid, methacrylic acid, itaconic acid, maleic acid, crotonic acid, etc.; sulfonic acid group-containing monomers such as 2-acrylamido-2-methylpropanesulfonic acid, etc.; and phosphoric acid-containing monomers such as 2-hydroxyethylacryloyl phosphate, 2-hydroxypropylacryloyl phosphate, etc. They are properly selected according to the purpose of use.

The monomer having an acid group as the component (c) is used in an amount of from 1 to 10% by weight, preferably from 2 to 8% by weight, and more preferably from 3 to 7% by weight, based on the total weights of the monomers.

If the amount of the component (c) is less than 1% by weight, the cohesive force of the pressure-sensitive adhesive is insufficient and if the amount thereof is over 10% by weight, the initial adhesive property of the pressure-sensitive adhesive is poor. That is, if the amount of the component (c) is outside the above-described range, it is difficult to impart good adhesive characteristics to the pressure-sensitive adhesive.

The monomer as the component (d) used in the present invention can be a monomer copolymerizable with the components (a) to (c) and specific examples thereof are vinyl actate, styrene, glycidyl(meth)acrylate, 2-hydroxyethyl(meth)acrylate, 2-hydroxypropyl (meth)acrylate, methyl (meth)acrylate, ethyl (meth)acrylate, propyl (meth)acrylate, and N-vinylpyrrolidone.

The monomer as the component (d) is used, if necessary, in an amount of 25% by weight or less, and preferably 20% by weight or less, per the total weights of the monomers. The monomers can be used alone or as mixtures thereof.

If the amount of the component (d) is over 25% by weight, the pressure-sensitive adhesive is difficult to show the performance as the acrylic pressure-sensitive adhesive and also it is difficult to obtain the pressure-sensitive adhesive having excellent adhesive force and durability.

The acrylic polymer of the present invention can be obtained by copolymerizing the monomer mixture comprising the components (a) to (c) or the components (a) to (d) described above by conventional method such as a solution polymerization method, an emulsion polymerization method, a bulk polymerization method, a suspension polymerization method, etc. In the case of the bulk polymerization method, the polymerization system by irradiation with ultraviolet rays is preferably employed.

The pressure-sensitive adhesive of the present invention comprises the acrylic polymer thus obtained as the main component and can contain, if necessary, a filler such as glass fibers, a metal powder, etc., and other additives such as a pigment, a coloring agent, etc. As optional components. Also, the pressure-sensitive adhesive may be properly subjected to a crosslinking treatment.

The crosslinking treatment can be applied by adding a polyfunctional (meth)acrylate as an internal crosslinking agent in obtaining the acrylic polymer or adding a polyfunctional isocyanate compound or epoxy compound as an external crosslinking agent after obtaining the acrylic polymer. As other method, a crosslinking treatment by the irradiation with electron rays or actinic rays may be applied.

The adhesive sheets of the present invention each is an adhesive sheet or tape prepared by forming a layer comprising the pressure-sensitive adhesive on one surface or both surfaces of a support at a desired thickness.

Examples of the support which can be used are a plastic film, a paper, a nonwoven fabric, a metal foil, etc. One surface or both surfaces of the support can be subjected to a surface treatment such as a releasing treatment or an adhesive treatment.

The pressure-sensitive adhesives and the adhesive sheets prepared using the pressure-sensitive adhesives in accordance with the present invention show a good adhesive property to various materials, in particular, hard plastics such as an acrylic resin, polystyrene, polyester, polyimide, etc., and metals and also have an excellent durability due to a very good retention performance of the pressure-sensitive adhesives and the adhesive sheet to various materials.

The reason for obtaining such adhesive characteristics in the present invention has not yet been clarified, but it is assumed that since the N,N-di-substituted (meth)acrylamide as the component (b) constituting the acrylic polymer does not have a hydrogen atom on the nitrogen atom adjacent to the carbonyl group, the N,N-di-substituted (meth)acrylamide can contribute to the improvement of the adhesive property by hydrogen bond with the surface of a material to which the pressure-sensitive adhesive is adhered and also, a hydrogen bond forms between the monomer having an acid group as the component (c) described above and the component (b), which gives a proper cohesive force to the pressure-sensitive adhesive.

As described above, according to the present invention, by using the acrylic polymer comprising the specific monomers as the main component, the pressure-sensitive adhesives and the adhesive sheets using them showing a good adhesive property to various materials and having an excellent durability can be provided.

The invention is described in more detail by reference to the following examples. Unless otherwise indicated, all percents, parts, ratios and the like are by weight.

EXAMPLE 1

In a reaction vessel equipped with a condenser, a nitrogen gas inlet pipe, a thermometer, an ultraviolet ray irradiation means, and a stirrer were placed 65 parts of 2-ethylhexyl acrylate, 15 parts of butyl acrylate, 16 parts of N-acryloylpyrrolidine, 4 parts of acrylic acid, and 0.08 part of 2,2-dimethoxy-2-phenylacetophenone as a polymerization initiator, and the mixture was polymerized by irradiation with ulutraviolet rays to obtain a polymer/monomer mixture having a conversion of 15% by weight.

After mixing 100 parts of the polymer/monomer mixture with 0.15 part of 1,6-hexanediol diacrylate, the mixture was coated on a polyester film having a thickness of 25 μm and irradiated with ultraviolet rays, whereby an adhesive tape having a pressure-sensitive adhesive layer of 50 μm was prepared.

EXAMPLE 2

In a reaction vessel equipped with a condenser, a nitrogen gas inlet pipe, a thermometer, and a stirrer were placed 70 parts of isononyl acrylate, 24 parts of N-acryloylmorpholine, 6 parts of methacrylic acid, 0.15 part of 2,2'-azobis-isobutyronitrile as a polymerization initiator, and 100 parts of ethyl acetate, and the reaction was carried out at 60° C. for 12 hours to obtain a polypher solution.

After mixing the polymer solution with tetraglycidyl-metaxylenediamine in an amount of 0.05 part per 100 parts (as the solid content) of the polymer, the mixture was coated on a polyester film having a thickness of 25 μm and dried, whereby an adhesive tape having a pressure-sensitive adhesive layer having a thickness of 50 μm was prepared.

EXAMPLE 3

By following the same ultraviolet ray irradiation as in Example 1 except that the monomer composition was changed to a monomer composition comprising 70 parts of 2-ethylhexyl acrylate, 5 parts of butyl acrylate, 20 parts of N,N-dimethylacrylamide, and 5 parts of acrylic acid, a polymer/monomer mixture having a conversion of 12% by weight was obtained.

After mixing 100 parts of the polymer/monomer mixture with 0.08 part of trimethylolpropane trimethacrylate, the mixture was coated on a polyester film having a thickness of 25 μm and irradiated with ultraviolet rays, whereby an adhesive sheet having a pressure-sensitive adhesive layer having a thickness of 50 μm was prepared.

COMPARATIVE EXAMPLE 1

By following the same reaction as in Example 2 except that the monomer composition was changed to a monomer comprising 70 parts of isononyl acrylate and 30 parts of N-acryloylmorpholine, a polymer solution was obtained. By further following the same procedure as in Example 2 using the polymer solution thus obtained, an adhesive tape having a pressure-sensitive adhesive layer having a thickness of 50 μm was prepared.

COMPARATIVE EXAMPLE 2

After mixing 100 parts (as solid content) of the polymer solution obtained by the method described in Comparative Example 1 with 20 parts of the pentaerythritol ester of polymerized rosin and 0.05 part of tetraglycidyl metaxylenediamine, the mixture was coated on a polyester film having a thickness of 25 μm and dried, whereby an adhesive tape having a pressure-sensitive adhesive layer having a thickness of 50 μm was prepared.

COMPARATIVE EXAMPLE 3

By following the same ultraviolet ray irradiation as in Example 1 except that the monomer composition was changed to a monomer composition comprising 70 parts of 2-ethylhexyl acrylate, 5 parts of butyl acrylate, 13 parts of N,N-dimethylacrylamide, and 12 parts of acrylic acid, a polymer/monomer mixture having a conversion of 14% by weight was obtained. By following the same procedure as in Example 3 using the mixture, an adhesive tape having a pressure-sensitive adhesive layer having a thickness of 50 μm was prepared.

COMPARATIVE EXAMPLE 4

By following the same ultraviolet ray irradiation as in Example 1 except that the monomer composition was changed to a monomer composition comprising 80 parts of 2-ethylhexyl acrylate, 10 parts of butyl acrylate, 5 parts of N,N-dimethylacrylamide, and 5 parts of acrylic acid, a polymer/monomer mixture having a conversion of 15% by weight was obtained. By following the same procedure as in Example 3 using the mixture, an adhesive tape having a pressure-sensitive adhesive layer having a thickness of 50 μm was prepared.

For each of the adhesive tapes obtained in Examples 1 to 3 and Comparative Examples 1 to 4, the peeling adhesive force and the retention force were measured in the manners shown below.

The results obtained are shown in the Table below.

Peeling Adhesive Force

Each adhesive tape of 20 mm × 100 mm was press-adhered to a polystyrene plate, an acrylic resin plate, an ABS (acrylonitrile-butadiene-styrene copolymer) plate, or a stainless steel plate sanded with a sand paper (#280) by a method of reciprocating once a roller of 2 kg. After 20 minutes, the 180° peeling adhesive force was measured under the atmosphere of 23° C. and 65% RH and at a pulling speed of 300 mm/minute.

In addition, in the Table, (A) stands for the polystrene plate, (B) the acrylic resin plate, (C) the ABS plate, and (D) the stainless steel plate.

Retention Force

Each adhesive tape having a width of 10 mm was adhered to a phenol resin plate at an adhered area of 10 mm × 20 mm. After 20 minutes, the assembly was allowed to stand at 80° C. for 20 minutes. The phenol resin plate was hung vertically, a uniform load of 600 g was applied to the free end of the adhesive tape, and the falling time (minutes) of the adhesive tape at 80° C. and the slipped amount (mm) after 240 minutes were measured.

TABLE

| | Peeling Adhesive Force (g/20 mm width) | | | | Retention Force | |
|---|---|---|---|---|---|---|
| | A) | (B) | (C) | (D) | Time (min.) | Slipped Amount (mm) |
| Example 1 | 1,420 | 1,500 | 1,560 | 1,320 | >240 | <0.5 |
| Example 2 | 1,280 | 1,320 | 1,410 | 1,210 | >240 | <0.5 |
| Example 3 | 1,320 | 1,400 | 1,440 | 1,270 | >240 | <0.5 |
| Comparative Example 1 | 720 | 810 | 910 | 850 | 154 | — |
| Comparative Example 2 | 920 | 970 | 1,150 | 1,060 | 37 | — |
| Comparative Example 3 | 500 | 740 | 890 | 920 | >240 | <0.5 |
| Comparative Example 4 | 780 | 820 | 990 | 1,080 | >240 | 2 |

As is clear from the results shown in the above Table, it can be seen that the adhesive tapes of the present invention obtained in Examples 1 to 3 show a good adhesive force to various materials, show good anti-creep characteristics (cf. slipped amount), and have a very excellent durability.

While the invention has been described in detail and with reference to specific embodiments thereof, it will be apparent to one skilled in the art that various changes and modifications can be made therein without departing from the spirit and scope thereof.

What is claimed is:

1. A pressure-sensitive adhesive comprising an acrylic polymer comprising the following components (a) to (d);
    (a) from 50 to 84% by weight of an acrylic monomer represented by formula (1);

$$CH_2=C(R^1)COO-R^2 \quad (1)$$

wherein $R^1$ represents hydrogen or methyl and $R^2$ represents an alkyl group having from 4 to 14 carbon atoms, (b) from 15 to 28% by weight of an N,N-di-substituted (meth)acrylamide represented by formula (2);

$$CH_2=C(R^3)CON-R^4 \quad (2)$$
$$\phantom{CH_2=C(R^3)CON-}\overset{|}{R^5}$$

wherein $R^3$ represents hydrogen or methyl and $R^4$ and $R^5$ represent an alkyl group or organic groups which combine with each other to form a heterocyclic ring with the N atom, (c) from 1 to 10% by weight of a monomer having an acid group, and
(d) from 0 to 25% by weight of other monomer copolymerizable with the components (a) to (c), the total amount of the components (a) to (d) being 100% by weight.

2. A pressure-sensitive adhesive as claimed in claim 1, wherein the acrylic monomer is acrylic acid esters or methacrylic acid esters.

3. A pressure-sensitive adhesive as claimed in claim 1, wherein the amount of the acrylic monomer is from 60 to 80% by weight.

4. A pressure-sensitive adhesive as claimed in claim 1, wherein the N,N-di-substituted (meth)acrylamide is at least one member selected from the group consisting of N,N-dimethyl(meth)acrylamide, N,N-diethyl(meth)acrylamide, N,N-dibutyl(meth)acrylamide, N-(meth)acryloylmorpholine, N-(meth)acryloylpyrrolidine, N-(meth)acryloylpyrrolidine, N-(meth)acryloylpiperidine, N-(meth)acryloylpyrrolidine, and N-(meth)acryloyl-4-piperidine.

5. A pressure-sensitive adhesive as claimed in claim 1, wherein the amount of the N,N-di-substituted (meth)acrylamide is from 16 to 25% by weight.

6. A pressure-sensitive adhesive as claimed in claim 1, wherein the amount of the N,N-di-substituted (meth)acrylamide is from 17 to 24% by weight.

7. A pressure-sensitive adhesive as claimed in claim 1, wherein the monomer containing an acid group is at least one member selected from the group consisting of carboxyl group-containing monomers, sulfonic acid group-containing monomers, and phosphoric acid-containing monomers.

8. A pressure-sensitive adhesive as claimed in claim 1, wherein the amount of the monomer containing an acid group is from 2 to 8% by weight.

9. A pressure-sensitive adhesive as claimed in claim 1, wherein the amount of the monomer containing an acid group is from 3 to 7% by weight.

10. A pressure-sensitive adhesive as claimed in claim 1, wherein the other monomer is at least one member selected from the group consisting of vinyl acetate, styrene, glycidyl (meth)acrylate, 2-hydroxyethyl (meth)acrylate, 2-hydroxypropyl (meth)acrylate, methyl (meth)acrylate, ethyl (meth)acrylate, propyl (meth)acrylate, and N-vinylpyrrolidone.

11. An adhesive sheet comprising a support having a layer of the pressure-sensitive adhesive as claimed in claim 1 on one surface or both surfaces thereof.

* * * * *